(12) United States Patent
Jalan et al.

(10) Patent No.: US 9,094,364 B2
(45) Date of Patent: Jul. 28, 2015

(54) METHODS TO MANAGE SERVICES OVER A SERVICE GATEWAY

(75) Inventors: Rajkumar Jalan, Saratoga, CA (US); Feilong Xu, San Jose, CA (US); Rishi Sampat, Santa Clara, CA (US)

(73) Assignee: A10 Networks, Inc., San Jose, CA (US)

( * ) Notice: Subject to any disclaimer, the term of this patent is extended or adjusted under 35 U.S.C. 154(b) by 830 days.

(21) Appl. No.: 13/337,030

(22) Filed: Dec. 23, 2011

(65) Prior Publication Data

US 2013/0166762 A1    Jun. 27, 2013

(51) Int. Cl.
| | |
|---|---|
| G06F 15/16 | (2006.01) |
| G06F 15/173 | (2006.01) |
| H04L 29/12 | (2006.01) |
| H04L 29/08 | (2006.01) |
| H04L 12/26 | (2006.01) |
| G06F 9/50 | (2006.01) |

(52) U.S. Cl.
CPC ............... H04L 61/00 (2013.01); H04L 67/00 (2013.01); *G06F 9/505* (2013.01); *H04L 43/0817* (2013.01); *H04L 61/103* (2013.01); *H04L 61/1541* (2013.01); *H04L 67/1008* (2013.01); *H04L 67/28* (2013.01)

(58) Field of Classification Search
CPC ...................................................... H04L 61/00
USPC .......................................................... 709/228
See application file for complete search history.

(56) References Cited

U.S. PATENT DOCUMENTS

| | | | |
|---|---|---|---|
| 5,774,660 A * | 6/1998 | Brendel et al. ................. | 709/201 |
| 5,935,207 A | 8/1999 | Logue et al. | |
| 5,958,053 A | 9/1999 | Denker | |
| 6,047,268 A | 4/2000 | Bartoli et al. | |
| 6,219,706 B1 | 4/2001 | Fan et al. | |
| 6,321,338 B1 | 11/2001 | Porras et al. | |
| 6,374,300 B2 * | 4/2002 | Masters ........................ | 709/229 |

(Continued)

FOREIGN PATENT DOCUMENTS

| | | |
|---|---|---|
| CN | 1529460 | 9/2004 |
| CN | 1575582 | 2/2005 |

(Continued)

OTHER PUBLICATIONS

Hunt et al, NetDispatcher: A TCP Connection Router, IBM Research Report RC 20853 May 19, 1997.*

(Continued)

*Primary Examiner* — Emmanuel L Moise
*Assistant Examiner* — Robert Shaw
(74) *Attorney, Agent, or Firm* — Carr & Ferrell LLP

(57) ABSTRACT

In activating a service, a service gateway retrieves a service table entry using a service or server address of the service entry, where the service table entry has an association with another service entry. An association to the service entry is added and a marker value is set to indicate associations with two service entries. After a time duration, the association with the other service entry is removed, and the marker value is changed accordingly. In deactivating a service entry, the service gateway calculates a hash value for the service or server address of the service entry. After matching the hash value to a hash value of another service entry, an association with the other service entry is added. A marker value is set to indicate associations with two service entries. After a time duration, the association with the service entry is removed, and the marker value is changed accordingly.

27 Claims, 10 Drawing Sheets

(56) References Cited

U.S. PATENT DOCUMENTS

| | | |
|---|---|---|
| 6,587,866 B1 * | 7/2003 | Modi et al. ............... 718/105 |
| 6,748,414 B1 | 6/2004 | Bournas |
| 6,772,334 B1 | 8/2004 | Glawitsch |
| 6,779,033 B1 | 8/2004 | Watson et al. |
| 7,010,605 B1 | 3/2006 | Dharmarajan |
| 7,076,555 B1 | 7/2006 | Orman et al. |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,310,686 B2 | 12/2007 | Uysal |
| 7,328,267 B1 | 2/2008 | Bashyam et al. |
| 7,337,241 B2 | 2/2008 | Boucher et al. |
| 7,343,399 B2 | 3/2008 | Hayball et al. |
| 7,370,353 B2 | 5/2008 | Yang |
| 7,391,725 B2 | 6/2008 | Huitema et al. |
| 7,398,317 B2 | 7/2008 | Chen et al. |
| 7,430,755 B1 | 9/2008 | Hughes et al. |
| 7,467,202 B2 | 12/2008 | Savchuk |
| 7,506,360 B1 | 3/2009 | Wilkinson et al. |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 * | 9/2009 | Wang et al. ............... 709/217 |
| 7,590,736 B2 * | 9/2009 | Hydrie et al. ............... 709/226 |
| 7,613,822 B2 * | 11/2009 | Joy et al. ............... 709/235 |
| 7,673,072 B2 | 3/2010 | Boucher et al. |
| 7,675,854 B2 | 3/2010 | Chen et al. |
| 7,707,295 B1 | 4/2010 | Szeto et al. |
| 7,792,113 B1 | 9/2010 | Foschiano et al. |
| 7,881,215 B1 * | 2/2011 | Daigle et al. ............... 370/252 |
| 7,970,934 B1 | 6/2011 | Patel |
| 7,990,847 B1 * | 8/2011 | Leroy et al. ............... 370/216 |
| 7,991,859 B1 | 8/2011 | Miller et al. |
| 8,090,866 B1 | 1/2012 | Bashyam et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,312,507 B2 | 11/2012 | Chen et al. |
| 8,554,929 B1 | 10/2013 | Szeto et al. |
| 8,560,693 B1 * | 10/2013 | Wang et al. ............... 709/226 |
| 8,584,199 B1 | 11/2013 | Chen et al. |
| 8,595,791 B1 | 11/2013 | Chen et al. |
| RE44,701 E | 1/2014 | Chen et al. |
| 8,782,221 B2 | 7/2014 | Han |
| 8,977,749 B1 | 3/2015 | Han |
| 2002/0032777 A1 | 3/2002 | Kawata et al. |
| 2002/0091844 A1 | 7/2002 | Craft et al. |
| 2002/0103916 A1 | 8/2002 | Chen et al. |
| 2002/0143991 A1 | 10/2002 | Chow et al. |
| 2002/0178259 A1 | 11/2002 | Doyle et al. |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023873 A1 | 1/2003 | Ben-Itzhak |
| 2003/0035409 A1 | 2/2003 | Wang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0078419 A1 * | 4/2004 | Ferrari et al. ............... 709/201 |
| 2004/0111516 A1 | 6/2004 | Cain |
| 2004/0187032 A1 | 9/2004 | Gels et al. |
| 2004/0199646 A1 | 10/2004 | Susai et al. |
| 2004/0202182 A1 | 10/2004 | Lund et al. |
| 2004/0210663 A1 | 10/2004 | Phillips et al. |
| 2004/0213158 A1 | 10/2004 | Collett et al. |
| 2005/0009520 A1 | 1/2005 | Herrero et al. |
| 2005/0027862 A1 * | 2/2005 | Nguyen et al. ............... 709/225 |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 * | 4/2005 | Yang et al. ............... 709/223 |
| 2005/0102400 A1 | 5/2005 | Nakahara et al. |
| 2005/0125276 A1 | 6/2005 | Rusu |
| 2005/0163073 A1 * | 7/2005 | Heller et al. ............... 370/328 |
| 2005/0198335 A1 * | 9/2005 | Brown et al. ............... 709/229 |
| 2005/0240989 A1 | 10/2005 | Kim et al. |
| 2006/0023721 A1 | 2/2006 | Miyake et al. |
| 2006/0036733 A1 | 2/2006 | Fujimoto et al. |
| 2006/0069804 A1 | 3/2006 | Miyake et al. |
| 2006/0077926 A1 | 4/2006 | Rune |
| 2006/0168319 A1 * | 7/2006 | Trossen ............... 709/238 |
| 2006/0187901 A1 | 8/2006 | Cortes et al. |
| 2006/0190997 A1 | 8/2006 | Mahajani et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0118881 A1 | 5/2007 | Mitchell et al. |
| 2007/0156919 A1 | 7/2007 | Potti et al. |
| 2007/0185998 A1 | 8/2007 | Touitou et al. |
| 2007/0195792 A1 | 8/2007 | Chen et al. |
| 2007/0259673 A1 | 11/2007 | Willars et al. |
| 2007/0283429 A1 | 12/2007 | Chen et al. |
| 2007/0288247 A1 | 12/2007 | Mackay |
| 2007/0294209 A1 | 12/2007 | Strub et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0250099 A1 | 10/2008 | Shen et al. |
| 2008/0291911 A1 | 11/2008 | Lee et al. |
| 2009/0070470 A1 | 3/2009 | Bauman et al. |
| 2009/0092124 A1 | 4/2009 | Singhal et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0222583 A1 | 9/2009 | Josefsberg et al. |
| 2009/0228547 A1 | 9/2009 | Miyaoka et al. |
| 2010/0008229 A1 | 1/2010 | Bi et al. |
| 2010/0061319 A1 | 3/2010 | Aso et al. |
| 2010/0064008 A1 | 3/2010 | Yan et al. |
| 2010/0083076 A1 | 4/2010 | Ushiyama |
| 2010/0094985 A1 | 4/2010 | Abu-Samaha et al. |
| 2010/0106833 A1 | 4/2010 | Banerjee et al. |
| 2010/0106854 A1 | 4/2010 | Kim et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235880 A1 | 9/2010 | Chen et al. |
| 2010/0265824 A1 * | 10/2010 | Chao et al. ............... 370/235 |
| 2010/0268814 A1 | 10/2010 | Cross et al. |
| 2010/0293296 A1 | 11/2010 | Hsu et al. |
| 2010/0318631 A1 | 12/2010 | Shukla |
| 2010/0333101 A1 | 12/2010 | Pope et al. |
| 2011/0007652 A1 | 1/2011 | Bai |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0093522 A1 | 4/2011 | Chen et al. |
| 2011/0110294 A1 | 5/2011 | Valluri et al. |
| 2011/0145324 A1 | 6/2011 | Reinart et al. |
| 2011/0191773 A1 | 8/2011 | Pavel et al. |
| 2011/0196971 A1 | 8/2011 | Reguraman et al. |
| 2011/0289496 A1 | 11/2011 | Steer |
| 2011/0307541 A1 | 12/2011 | Walsh et al. |
| 2012/0030341 A1 | 2/2012 | Jensen et al. |
| 2012/0084419 A1 | 4/2012 | Kannan et al. |
| 2012/0144015 A1 | 6/2012 | Jalan et al. |
| 2012/0170548 A1 | 7/2012 | Rajagopalan et al. |
| 2012/0173759 A1 | 7/2012 | Agarwal et al. |
| 2012/0297046 A1 | 11/2012 | Raja et al. |
| 2013/0046876 A1 | 2/2013 | Narayana et al. |
| 2013/0100958 A1 | 4/2013 | Jalan et al. |
| 2013/0136139 A1 | 5/2013 | Zheng et al. |
| 2013/0176854 A1 | 7/2013 | Chisu et al. |
| 2013/0198385 A1 | 8/2013 | Han et al. |
| 2014/0012972 A1 | 1/2014 | Han |

(56) References Cited

U.S. PATENT DOCUMENTS

| | | |
|---|---|---|
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2015/0039671 A1 | 2/2015 | Jalan et al. |

FOREIGN PATENT DOCUMENTS

| | | |
|---|---|---|
| CN | 1725702 | 1/2006 |
| CN | 101094225 | 12/2007 |
| CN | 101189598 | 5/2008 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| EP | 1209876 A2 | 5/2002 |
| EP | 1770915 A1 | 4/2007 |
| EP | 1885096 A1 | 2/2008 |
| EP | 2577910 | 4/2013 |
| EP | 2622795 | 8/2013 |
| EP | 2647174 | 10/2013 |
| EP | 2760170 | 7/2014 |
| HK | 1182560 | 11/2013 |
| HK | 1183569 A | 12/2013 |
| HK | 1183996 A | 1/2014 |
| HK | 1189438 | 6/2014 |
| JP | 2013528330 | 5/2011 |
| KR | 10-0830413 B1 | 5/2008 |
| WO | 01/13228 A2 | 2/2001 |
| WO | 2001014990 | 3/2001 |
| WO | 2003103237 | 12/2003 |
| WO | 2008053954 | 5/2008 |
| WO | 2001049770 A2 | 4/2011 |
| WO | 2011149796 A2 | 12/2011 |
| WO | 2012050747 | 4/2012 |
| WO | 2012075237 A2 | 6/2012 |
| WO | 2013070391 A1 | 5/2013 |
| WO | 2013081952 A1 | 6/2013 |
| WO | 2013096019 A1 | 6/2013 |
| WO | 2013112492 | 8/2013 |
| WO | 2014052099 | 4/2014 |
| WO | 2014088741 | 6/2014 |
| WO | 2014093829 | 6/2014 |

OTHER PUBLICATIONS

Cardellini et al, Dynamic Load Balancing on Web-server SystemsIEEE Internet Computing, vol. 3, No. 3, May-Jun. 1999 pp. 28-39.*

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

* cited by examiner

METHODS TO MANAGE SERVICES OVER A SERVICE GATEWAY

BACKGROUND OF THE INVENTION

1. Field

This invention relates generally to data communications, and more specifically, to a service gateway.

2. Background

Service gateways such as server load balancers, firewalls, or traffic managers are typically deployed to bridge services between client computing devices and application servers. The number of client computing devices proliferates in past few years in the areas of consumer computers, mobile computing devices, smartphones, and gaming devices.

When the number of client devices increases, the number of service sessions between client devices and application servers increases accordingly. Traditional stateful session packet processing used by service gateways gives way to stateless packet processing. Stateless packet processing is more efficient in computation and in memory consumption. It suits well in order to scale up services for an expected large number of service sessions. A typical stateless packet processing method uses a form of hash table. The table is stored with predetermined servers and applications information.

At the same time, the number of applications also increases rapidly as consumers and corporations install new applications on their computing devices. More servers are installed every day, and more applications become available every hour. In order to activate a server or an application in a server, operator needs to update the hash table with the additional server or application information. Often times, updating the table means replacing an existing server or application information of a table entry with the activating server or application information. Such table entry content replacement is disruptive to on-going service session using the existing table entry. Data packets of any on-going service session would not be forwarded to the proper server or client device. For example, if a consumer is watching a Netflix™ streaming video, the video stream will be abruptly stopped. If a corporate worker is in the middle of a business transaction, the transaction will be stalled. The worker needs to restart the transaction. In a worst case, the worker may need to find out which part of the transaction had been completed in order to avoid duplicating the completed portion of the transaction.

In addition to activating a new server or application, during maintenance such as backup, software update, hardware replacement, servers and applications are often taken off line. The corresponding table entries will also need to be replaced as the server or the application on a server is no longer available at the table entry. It is desirable to replace the table entry with a second server or another server running the same application.

It is highly desirable to have a stateless packet processing method while services can be managed to allow a server or an application on a server to be added or removed, without interrupting existing service sessions.

Therefore, there is a need for a method to manage services over a service gateway using stateless packet processing method.

BRIEF SUMMARY OF THE INVENTION

According to one embodiment of the present invention, a method for managing services by a service gateway comprises: (a) receiving a first service entry for a service to be activated by the service gateway, the first service entry comprising a first service address associated with the first service and a first server address; (b) retrieving a service table entry of a service mapping table using the first service address or the first server address of the first service entry, the service table entry having an association with a second service entry, the second service entry comprising a second service address and a second server address; (c) adding to the service table entry an association to the first service entry; (d) storing a marker value associated with the service table entry to indicate that the service table entry is associated with a plurality of service entries; (e) setting a timer associated with the service table entry to a predetermined duration; (f) in response to an expiration of the timer, removing the association with the second service entry from the service table entry; and (g) in response to removing the association with the second service from the service table entry, changing the marker value to indicate that the service table entry is not associated with a plurality of service entries.

In one aspect of the present invention, prior to the removing of the association with the second service entry from the service table entry, the method further comprises: (h) receiving a data packet by the service gateway from a host, the data packet comprising a third service address; (i) comparing the third service address of the data packet with the first service address of the first service entry or with the second service address of the second service entry; (j) in response to finding a match between the third service address and the first service address, or between the third service address and the second service address, determining the marker value associated with the service table entry; (k) in response to determining that the marker value indicates that the service table entry is associated with a plurality of service entries, creating a session entry based on the service table entry and storing the session entry in a session table; (l) in response to finding the match between the third service address and the first service address, modifying the data packet by replacing the third service address with the first server address; (m) in response to finding the match between the third service address and the second service address, modifying the data packet by replacing the third service address with the second server address; and (n) sending the modified data packet to the first server address or the second server address.

In one aspect of the present invention, prior to the removing of the association with the second service entry from the service table entry, the method further comprises: (h) receiving a data packet by the service gateway from a server, the data packet comprising a third server address; (i) comparing the third server address of the data packet with the first server address of the first service entry or with the second server address of the second service entry; (j) in response to finding a match between the third server address and the first server address, or between the third server address and the second server address, determining the marker value associated with the service table entry; (k) in response to determining that the marker value indicates that the service table entry is associated with a plurality of service entries, creating a session entry based on the service table entry and storing the session entry in a session table; (l) in response to finding the match between the third server address and the first server address, modifying the data packet by replacing the third server address with the first service address; (m) in response to finding the match between the third server address and the second server address, modifying the data packet by replacing the third server address with the second service address; and (n) sending the modified data packet to a host address from the data packet.

In one aspect of the present invention, the receiving (h) comprises: (h1) receiving the data packet from the host; (h2) comparing the data packet against session entries in the session table; (h3) in response to finding a match between the data packet and a given session entry in the session table: (h3i) modifying the data packet by replacing the third service address with a given server address in the given session entry; (h3ii) skipping the comparing (i), the determining (j), the creating (k), the modifying (l), the modifying (m), and the sending (n); and (h3iii) sending the modified data packet to the given server address; and (h4) in response to finding no matches between the data packet and the session entries, performing the comparing (i), the determining (j), the creating (k), the modifying (l), the modifying (m), and the sending (n).

In one embodiment of the present invention, a method for managing services by a service gateway, comprises: (a) receiving an indication to deactivate a first service entry for a service, the first service entry comprising a first service address associated with the service and a first server address, the first service entry associated with a service table entry of a service mapping table; (b) calculating a first hash value for the first service address or the first server address of the first service entry; (c) determining whether a second hash value of a second service entry in the service mapping table matches the first hash value, the second service entry comprising a second service address and a second server address; (d) in response to determining that the second hash value matches the first hash value, adding an association with the second service entry to the service table entry; (e) storing a marker value associated with the service table entry to indicate that the service table entry is associated with a plurality of service entries; (f) setting a timer associated with the service table entry to a predetermined duration; (g) in response to an expiration of the timer, removing the association with the first service entry from the service table entry; and (h) in response to removing the association with the first service entry from the service table entry, changing the marker value to indicate that the service table entry is not associated with a plurality of service entries.

System and computer program products corresponding to the above-summarized methods are also described and claimed herein.

DETAILED DESCRIPTION OF THE INVENTION

Figure 1:
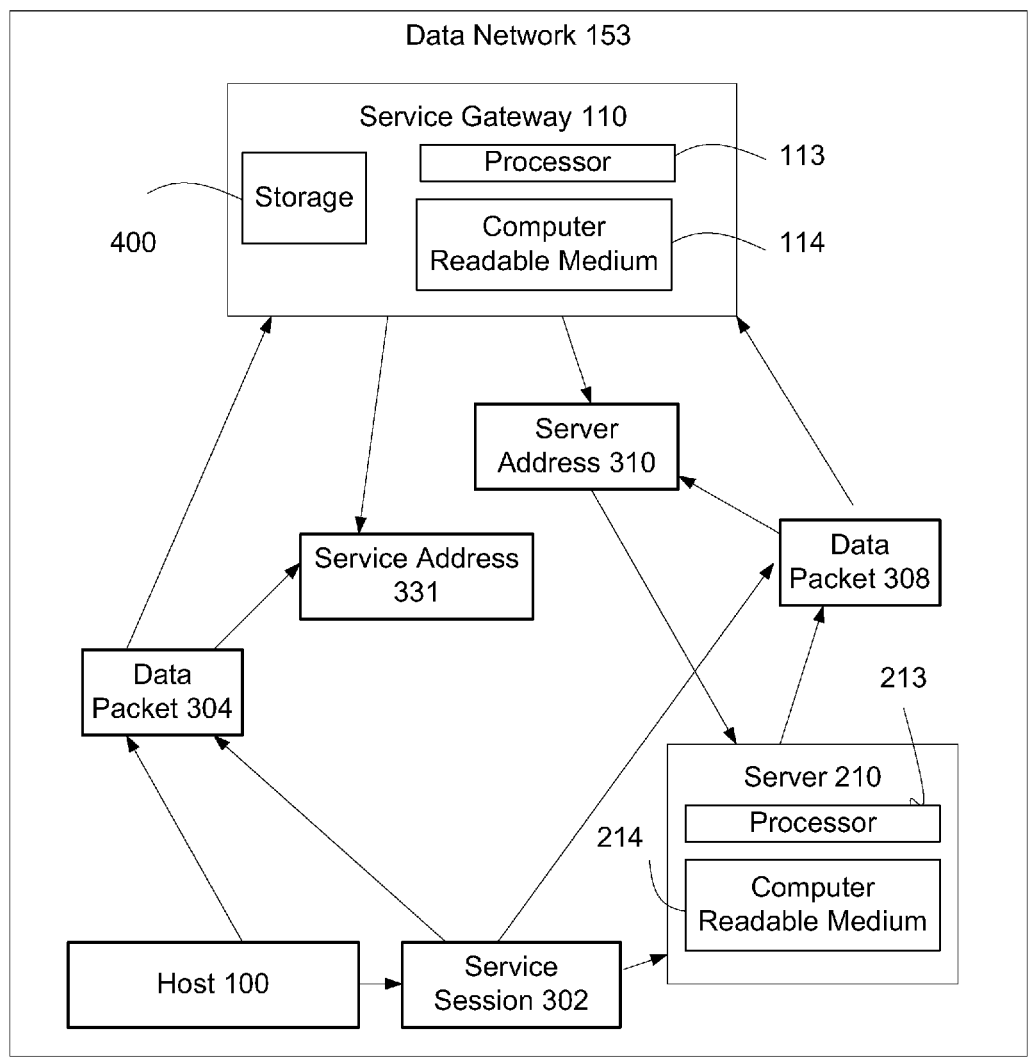
FIG. 1 illustrates an embodiment of a stateless service gateway between a host and a plurality of service addresses according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In an embodiment illustrated in FIG. 1, a service gateway 110 processes a service session 302 between a host 100 and a server 210. In one embodiment, service session 302 is a Web service session such as a HTTP (Hypertext Transport Protocol) session, a secure HTTP session, a FTP (File Transfer Protocol) session, a file transfer session, a SIP (Session Initiation Protocol) session, a session based on Web technology, a video or audio streaming session, a Web conferencing session, or any session over the Internet, corporate network, data center network, or a network cloud. Service session 302 includes a plurality of data packets between host 100 and server 210. Service session 302 is delivered over a data network 153.

Host 100 is a computing device with network access capabilities. In one embodiment, host 100 is a workstation, a desktop personal computer or a laptop personal computer. In one embodiment, host 100 is a Personal Data Assistant (PDA), a tablet PC, a smartphone, or a cellular phone. In one embodiment, host 100 is a set-top box, an Internet media viewer, an Internet media player, a smart sensor, a smart medical device, a net-top box, a networked television set, a networked DVR, a networked Blu-ray player, or a media center.

Service gateway 110 is operationally coupled to a processor 113 and a computer readable medium 114. The computer readable medium 114 stores computer readable program code, which when executed by the processor 113, implements the various embodiments of the present invention as described herein. In some embodiments, service gateway 110 is implemented as a server load balancer, an application delivery controller, a service delivery platform, a traffic manager, a security gateway, a component of a firewall system, a component of a virtual private network (VPN), a load balancer for video servers, or a gateway to distribute load to one or more servers.

Server 210 is operationally coupled to a processor 213 and a computer readable medium 214. The computer readable medium 214 stores computer readable program code, which when executed by the processor 213, implements the various embodiments of the present invention as described herein. In some embodiments, the computer readable program code implements server 210 as a Web server, a file server, a video server, a database server, an application server, a voice system, a conferencing server, a media gateway, a SIP server, a remote access server, a VPN server, a media center, an app server or a network server providing a network or application service to host 100.

In one embodiment, data network 153 is an Internet Protocol (IP) network. In one embodiment, data network 153 is a corporate data network or a regional corporate data network. In one embodiment, data network 153 is an Internet service provider network. In one embodiment, data network 153 is a residential data network. In one embodiment, data network 153 includes a wired network such as Ethernet. In one embodiment, data network 153 includes a wireless network such as a WiFi network, or cellular network. In one embodiment, data network 153 resides in a data center, or connects to a network or application network cloud.

In one embodiment, service session 302 includes a data packet 304 from host 100. Data packet 304 includes a service address 331. In one embodiment, service address 331 includes an IP address. In one embodiment, service address 331 includes an application layer address or a transport layer port number, such as transmission control protocol (TCP) port number or user datagram protocol (UDP) port number. Service address 331 is associated with service gateway 110 so that the service data packet 304 of service session 302 is processed by the service gateway 110. In one embodiment, service address 331 includes a destination IP address of service data packet 304, and optionally includes destination transport layer port number of service data packet 304.

Service gateway 110 determines a server address 310 associated with the service address 331 obtained from service data packet 304. In one embodiment, server address 310 includes a network address or IP address of server 210. In one embodiment, server address 310 includes an application layer address, such as a TCP port number or a UDP port number of server 210.

Based on server address 310, service gateway 110 modifies service data packet 304 by replacing service address 331 with server address 310. Service gateway 110 sends modified service data packet 304 to server 210.

In one embodiment, service gateway 110 receives a data packet 308 of service session 302 from server 210. Service gateway 110 processes data packet 308. Data packet 308 includes server address 310. Service gateway 110 determines a service address 331 associated with server address 310 obtained from service data packet 308. Service gateway 110 modifies data packet 308 by replacing server address 310 with service address 331. Service gateway 110 sends modified data packet 308 to host 100.

In one embodiment, service gateway 110 includes storage 400, and a service mapping table 412 (not shown) stored in storage 400. In one embodiment, storage 400 is a memory module residing in service gateway 110. In one embodiment, service gateway 110 includes a network processing module (not shown) comprising a field programmable gate array (FPGA), a network processor, an application specific integrated circuit (ASIC). Storage 400 is associated with the network processing module. Examples of storage 400 in this embodiment include a content addressable memory (CAM), a ternary content addressable memory (TCAM), a static random accessible memory (SRAM), or a dynamic random accessible memory (DRAM).

Figure 2:
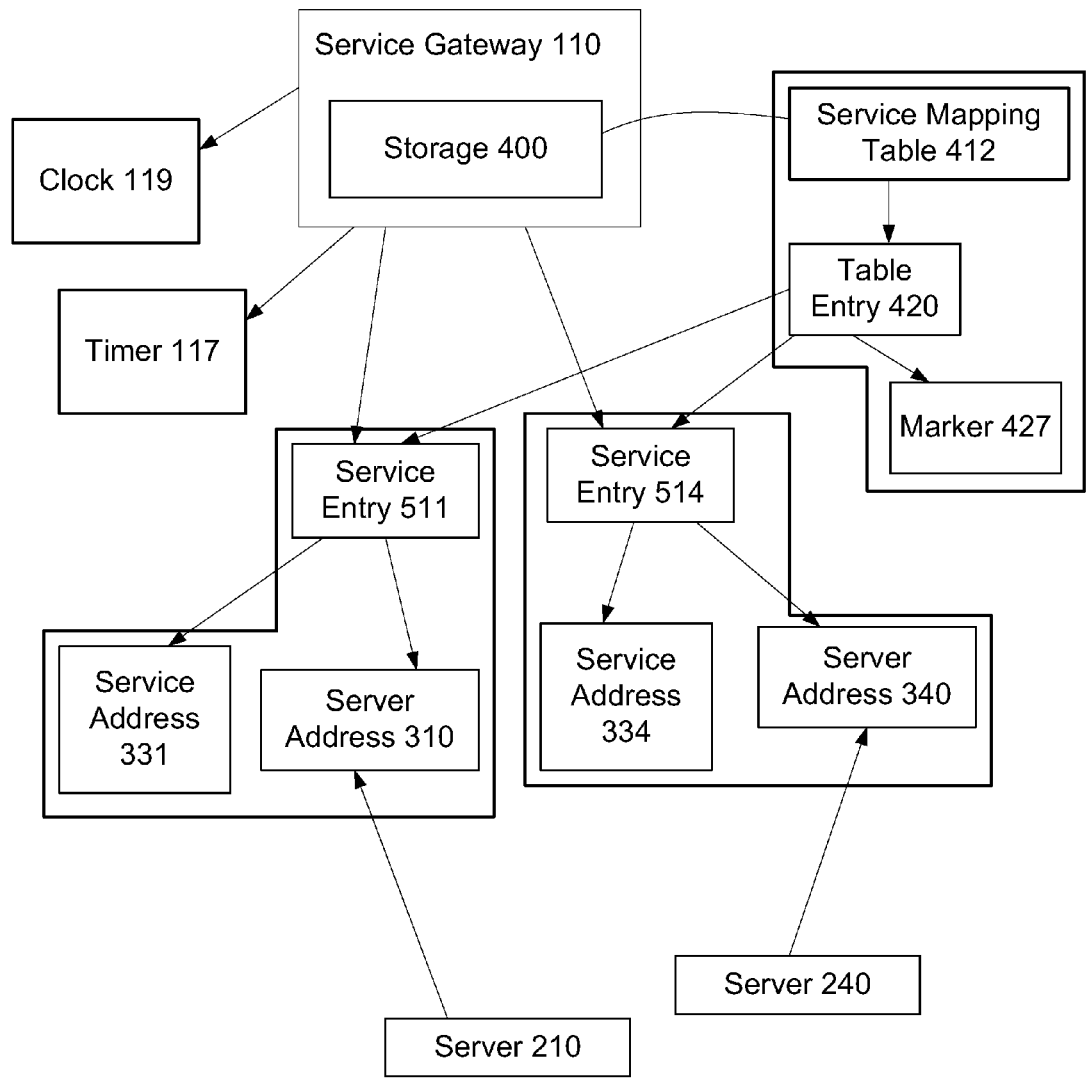
FIG. 2 illustrates an embodiment of a managed service mapping table for a stateless service gateway according to the present invention.

FIG. 2 illustrates an embodiment of a managed service mapping table 412 of service gateway 110 according to the present invention. In one embodiment, service gateway 110 includes a service entry 511 and a service entry 514. Service entry 511 includes service address 331 and server address 310, associating service address 331 and server address 310. Service entry 514 includes service address 334 and server address 340, associating service address 334 and server address 340. Server address 310 is different from server address 340. Server address 310 is associated with server 210 and server address 340 is associated with server 240. In one embodiment, server 210 is the same as server 240. Server address 310 associates with a server software application different from the server software application associated to server address 340. In one embodiment, server address 310 and server address 340 are associated with a same server software application whereas server 210 is different from server 240. In one embodiment, server address 310 and server address 340 are not related to each other.

In one embodiment, service mapping table 412 includes a service table entry 420 which is associated with service entry 511. Service gateway 110 may modify service table entry 420 from being associated with service entry 511 to being associated with service entry 514.

In one embodiment, for host 100 to use the service associated with service entry 514, service gateway 110 activates service entry 514. Service gateway 110 selects service table entry 420 to activate service entry 514, wherein service table entry 420 also has an association with service entry 511. A process for determining the service table entry 420 in order to activate service entry 514 is described further below with reference to FIG. 4.

In one embodiment, to deactivate the service associated with service entry 511, service gateway 110 removes service entry 511 from service table entry 420. Service gateway 110 selects service entry 514 to replace service entry 511 in service table entry 420. A process for selecting the service entry 514 to replace service entry 511 in service table entry 420 is described further below with reference to FIG. 5.

In one embodiment, service gateway 110 modifies service table entry 420 to include an association with a second service entry 514. Service table entry 420 is thus associated with both service entry 511 and service entry 514. In one embodiment, service gateway 110 stores a change marker 427 into service table entry 420. In one embodiment, service table entry 420 includes a change marker 427 and service gateway 110 modifies the change marker 427 value to "TRUE" to indicate that service table entry 420 includes two service entry associations. The association of service table entry 420 with two service entries indicates that one service entry is to be removed and is to be replaced by the other service entry will remain associated with service table entry 420.

In one embodiment, service gateway 110 is connected to a clock 119. Service gateway 110 includes a timer 117. Service gateway 110 sets timer 117 to a predetermined time period such as 10 minutes, 5 seconds, 2 minutes, or 1 hour. Service gateway 110 sets timer 117 while storing service entry 514 into service table entry 420. Service gateway 110 checks clock 119 to determine if timer 117 expires. When timer 117 expires, service gateway 110 changes marker 427 to "FALSE" or removes marker 427 from service table entry 420. Service gateway 110 also removes the association to service entry 511 from service table entry 420. The use of the timer 117 is described further below with reference to FIGS. 4 and 5.

FIGS. 3a-3f illustrate an embodiment of a data packet processing of service gateway using a service mapping table according to the present invention.

Figure 3A:
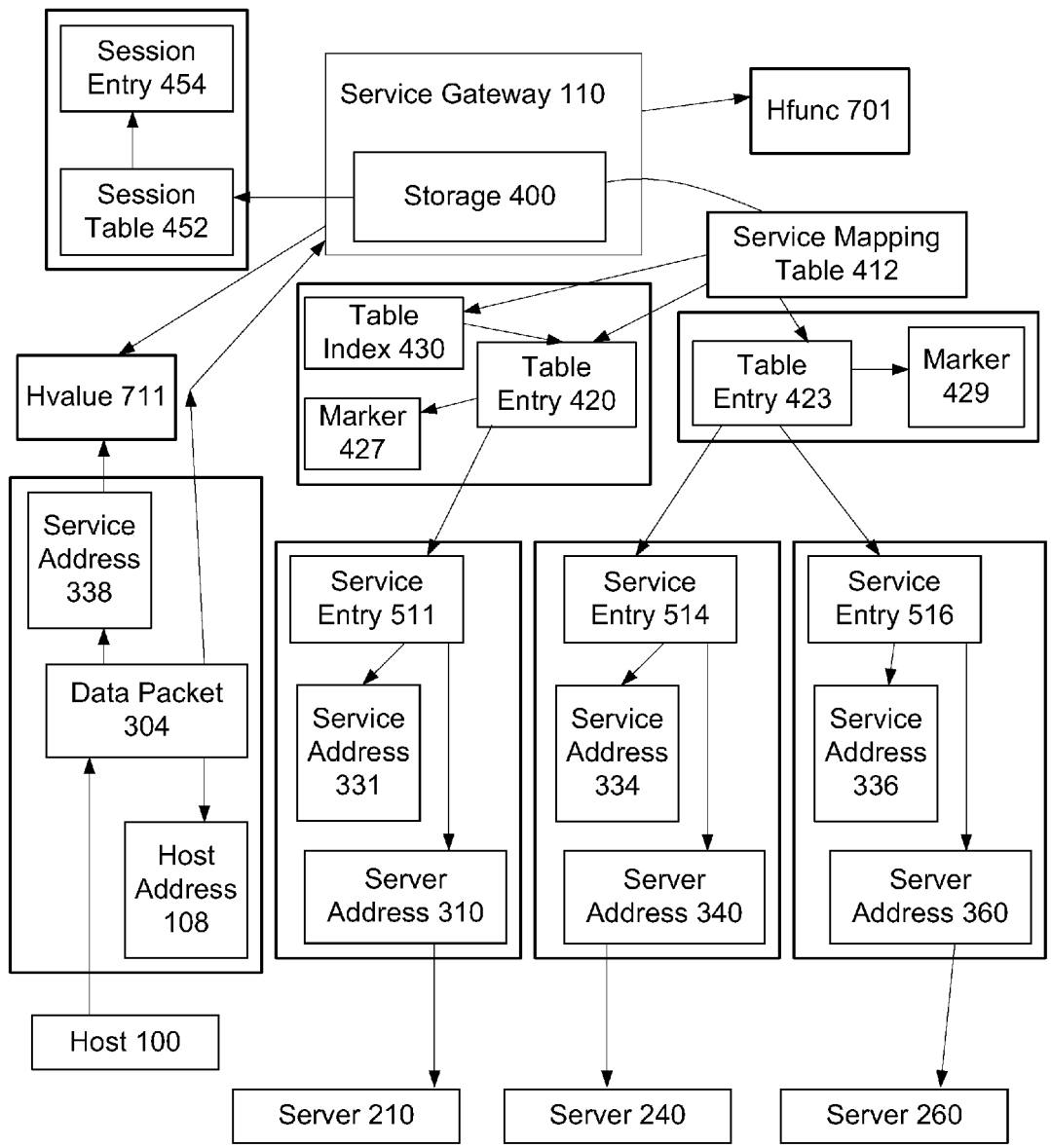
FIGS. 3a-3f illustrates an embodiment of a data packet processing method according to the present invention.

In one embodiment illustrated in FIG. 3a, service gateway 110 includes a session table 452 for storing information for sessions between hosts and servers. Session table 452 is stored in storage 400.

Service mapping table 412 includes a service table entry 420 and a service table entry 423. Service table entry 420 includes marker 427, which here has a value of "FALSE". The service table entry 420 is associated with service entry 511. Service entry 511 stores service address 331 and server address 310 associated with server 210.

Service table entry 423 includes marker 429, which here has a value of "TRUE". Service table entry 423 is associated with service entry 514 and service entry 516. Service entry 514 includes service address 334 and server address 340 associated with server 240. Service entry 516 stores service address 336 and server address 360 associated with server 260.

In one embodiment, service gateway 110 receives a data packet 304 from host 100. Service gateway 110 obtains service address 338 from data packet 304. Service gateway 110 compares service address 338 against service mapping table 412, and finds a match with service table entry 420.

In one embodiment, service mapping table 412 includes a plurality of service table entries. A service table entry 420 is indexed by a table index 430. In one embodiment, service mapping table 412 has 1000 entries and the table index 430 has an integer value between 0 and 999. In one embodiment, table index 430 has a value between 1 and 1000. In one embodiment table index has a value between 55 and 4897, or between −7 to 198024. In one embodiment, table index 430 has non-integer value.

In one embodiment, service gateway 110 includes a hash function HFunc 701. Service gateway 110 compares service address 338 against service mapping table 412 using HFunc 701.

Service gateway 110 applies HFunc 701 to service address 338 to obtain a hash value HValue 711. Service gateway 110 compares HValue 711 against service mapping table 412 to finds a match with table index 430. Service gateway 110 retrieves service table entry 420 using table index 430. In one embodiment, HValue 711 has the same value as table index 430.

Examples of hash functions HFunc 701 include CRC checksum functions and other checksum functions; hash functions using a combination of bit-wise operators such as bit-wise AND operator, bit-wise OR operator, bit-wise NAND operator and bit-wise XOR operator; MD5 hash functions and other cryptography hash functions; Jenkins hash function and other non-cryptography hash functions; hardware based hash functions implemented in FPGA, ASIC or an integrated circuit board of service gateway 110; and other types of hash functions or table lookup functions. Typically such hash functions are simple and can be calculated rapidly by service gateway 110.

Service gateway 110 checks marker 427 of service table entry 420. Marker 427 has a value "FALSE". Service gateway 110 modifies data packet 304 by replacing service address 338 with server address 310. Service gateway 110 sends modified data packet 304 to server 210, which is associated with server address 310.

Figure 3B:
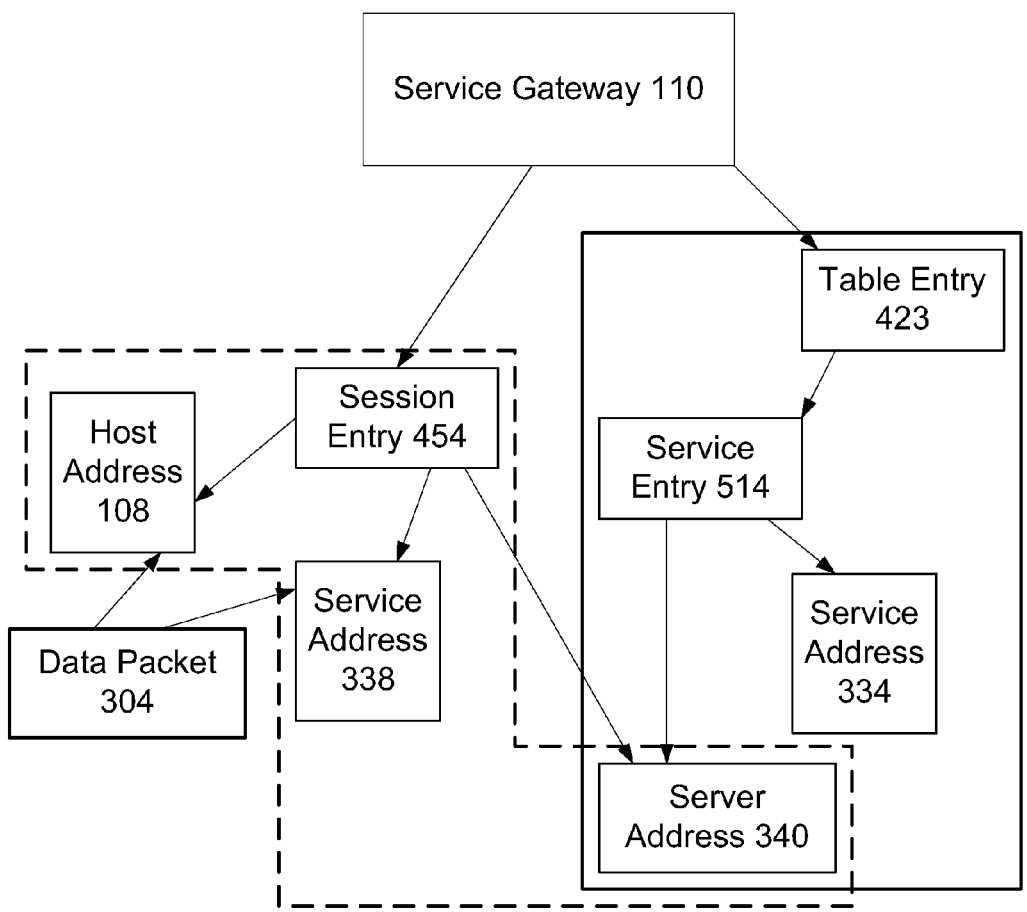

In one embodiment, assume that the service associated with service entry 514 is to be replaced by the service associated with service entry 516, i.e., service entry 514 is to be replaced by service entry 516 in service table entry 423. Service gateway 110 compares service address 338 with service table entry 423 and finds a match between service address 338 and service address 334 of the associated service entry 514. In response, service gateway 110 determines marker 429 of service table entry 423 to be "TRUE". Service gateway 110 creates a session entry 454 based on service table entry 423. Referring now to FIG. 3b, in one embodiment, service gateway 110 uses the associated service entry 514 of service table entry 423 to create session entry 454. Service gateway 110 obtains server address 340 from service entry 514, and stores service address 338 and server address 340 into session entry 454. In one embodiment, service gateway 110 obtains host address 108 from data packet 304 and stores host address 108 into session entry 454. Host address 108 is associated with host 100. In one embodiment, host address 108 includes an IP address or a network address of host 100. In one embodiment, host address 108 further includes an application layer address, a TCP port number, or a UDP port number of host 100. Service gateway 110 stores session entry 454 into session table 452. Service gateway 110 uses session entry 454 to process data packet 304. Service gateway 110 modifies data packet 304 by replacing service address 338 by server address 340 of session entry 454. Service gateway 110 sends modified data packet 304 to server 240.

Figure 3C:
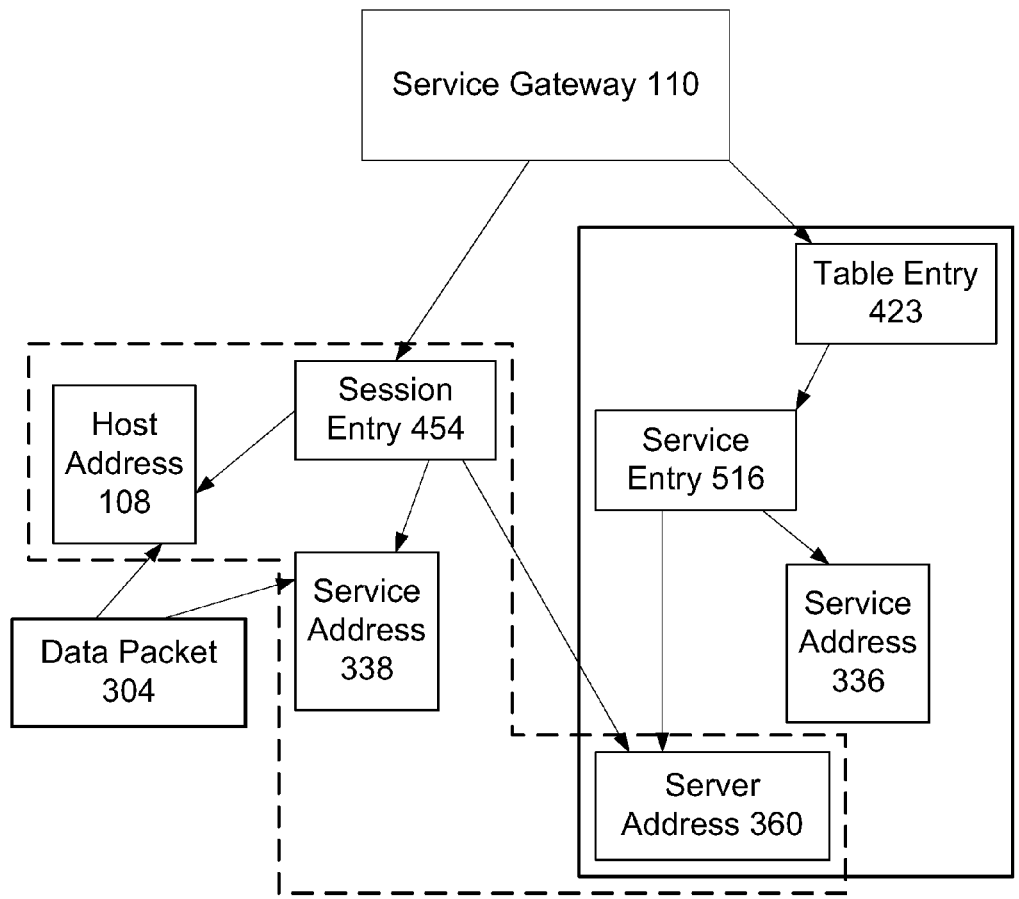

In one embodiment, service gateway 110 compares service address 338 against service table entry 423 and finds service address 338 matching service address 336 of the associated service entry 516 of service table entry 423, the new associated service entry. Service gateway 110 determines marker 429 of service table entry 423 to be "TRUE". Referring now to FIG. 3c, service gateway 110 uses service entry 516 to create session entry 454. Service gateway 110 stores service address 338, server address 360 of service entry 516 into session entry 454. In one embodiment, service gateway 110 stores host address 108 into session entry 454. Service gateway 110 modifies data packet 304 by replacing service address 338 by server address 360 and sends modified data packet 304 to server 260.

In one embodiment, service gateway 110 checks if data packet 304 includes a session request. For example, data packet 304 includes a TCP SYN packet. Service gateway 110 uses new associated service entry 516 of service table entry 423 to create session entry 454, as described above with reference to FIG. 3c.

In one embodiment, service gateway 110 compares data packet 304 against session table 452 prior to comparing data packet 304 against service mapping table 412. In one embodiment, service gateway 110 matches service address 338 of data packet 304 against session table 452. In one embodiment, service gateway 110 further obtains host address 108 of data packet 304, and compares service address 338 and host address 108 against session table 452. In an embodiment, service gateway 110 finds a match with session entry 454. Service gateway 110 modifies data packet 304 by replacing service address 338 of data packet 304 by server address of session entry 454, and sends modified data packet 304 to the associated server of the server address of session entry 454.

In one embodiment, service gateway 110 does not find a match between data packet 304 and session table 452. In response, service gateway 110 proceeds to compare data packet 304 against service mapping table 412, as described above.

Figure 3D:
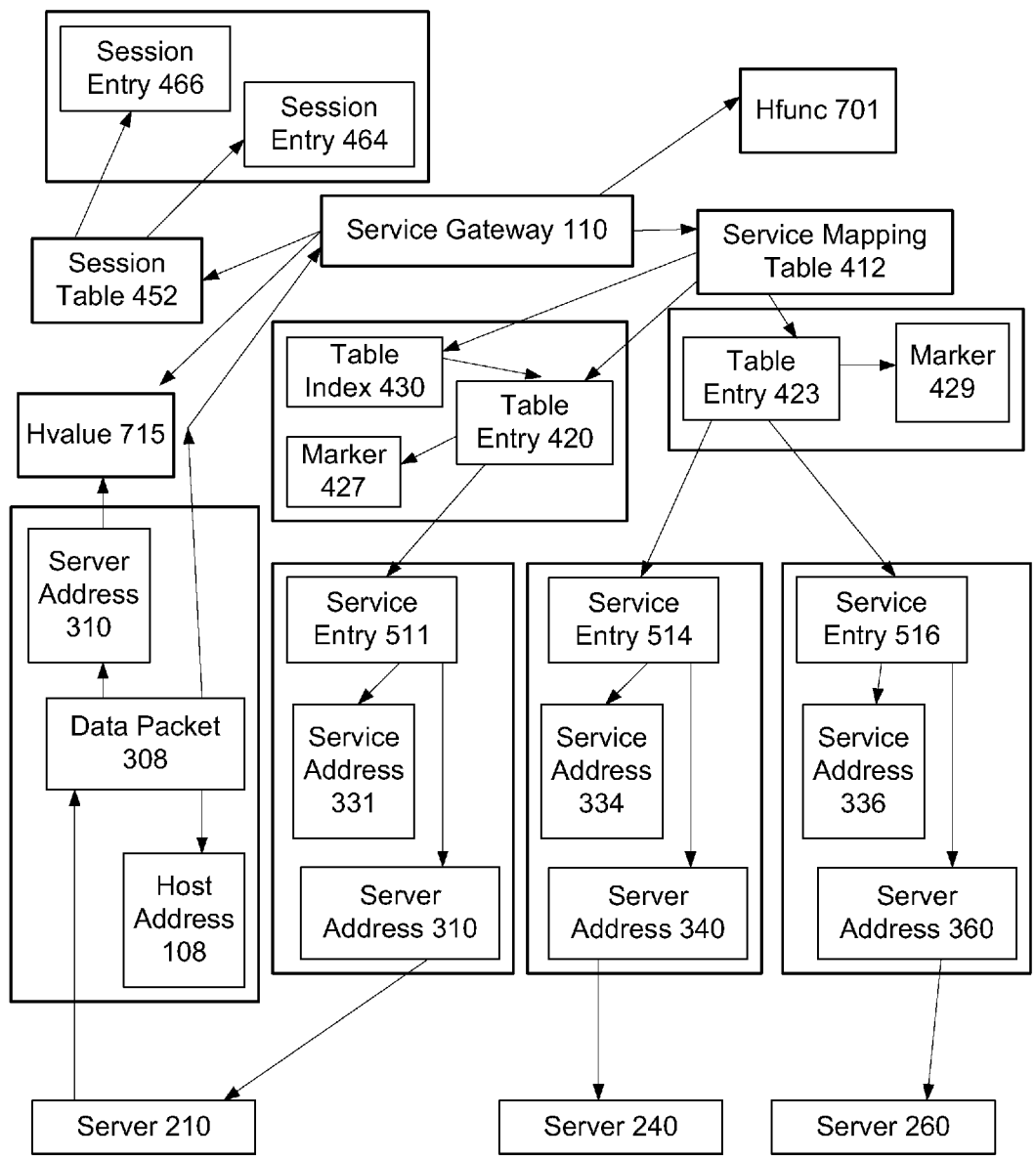
Figure 3E:
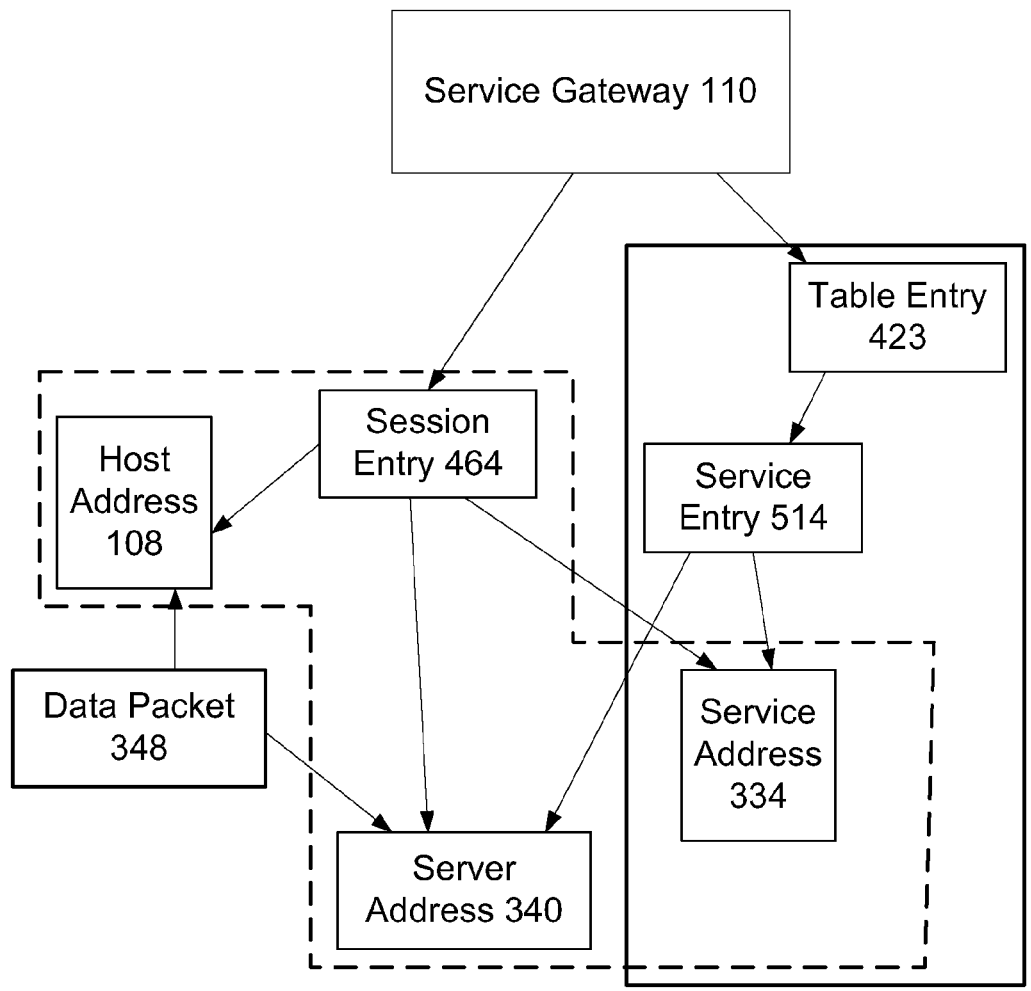

Referring now to FIG. 3d, in one embodiment, service gateway 110 receives a data packet 308 from a server. In one embodiment, service gateway 110 receives data packet 308 from server 210. Service gateway 110 obtains server address 310 of data packet 308, compares server address 310 against service mapping table 412, and finds a match with service table entry 420. In one embodiment, service gateway 110 applies hash function HFunc 701 to server address 310 to obtain HValue 715. Service gateway 110 compares HValue 715 against service mapping table 412 and finds a match with table index 430. Service gateway 110 retrieves service table entry 420 using table index 430. Service gateway 110 checks marker 427 of service table entry 420 to be "FALSE". Service gateway 110 modifies data packet 308 by replacing server address 310 by service address 331 of service entry 511 of service table entry 420. Service gateway 110 sends modified data packet 308 to host 100.

In one embodiment, service gateway 110 receives data packet 348 from server 240. Service gateway 110 obtains server address 340 of data packet 348, and compares server address 340 against service mapping table 412. Service gateway 110 finds a match with service table entry 423. Service gateway 110 checks marker 429 of service table entry 423 to be "TRUE". In response, referring to FIG. 3e, service gateway 110 creates a session entry 464 (FIG. 3e) using server address 340 and service table entry 423. Service gateway 110 stores server address 340 in session entry 464. Service gateway 110 further checks and determines server address 340 matches the existing associated service entry 514 of service table entry 423. Service gateway 110 associates session entry 464 to service address 334 of service entry 514 in session entry 464. Service gateway 110 stores the session entry 464 in the session table 452. In one embodiment, service gateway 110 extracts host address 108 from data packet 348 and stores host address 108 in session entry 464 as well.

Service gateway 110 modifies data packet 348 by replacing server address 340 with service address 331, and sends modified data packet 348 to host 100, which is associated with host address 108.

Figure 3F:
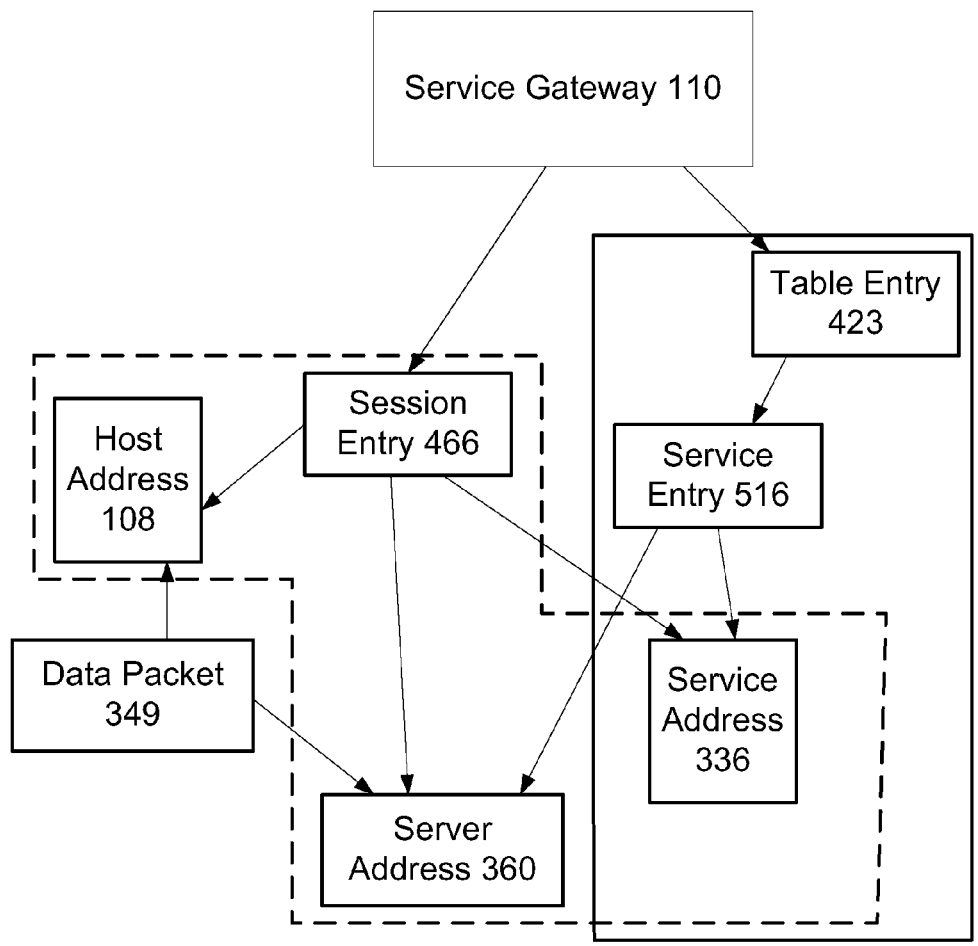

In one embodiment, service gateway 110 receives data packet 349 from server 260. Service gateway 110 obtains server address 360 of data packet 349, and compares server address 360 against service table entry 423. Service gateway 110 finds a match with service table entry 423. Service gateway 110 checks marker 429 of service table entry 423 to be "TRUE". Service gateway 110 further determines server address 360 of data packet 349 matches server address 360 of service entry 516 associated with service table entry 423. Referring now to FIG. 3f, service gateway 110 creates a session entry 466 using server address 360 and service entry 516. Service gateway 110 stores server address 360 and service address 336 of service entry 516 into session entry 466. Service gateway 110 stores session entry 466 into session table 452. In one embodiment, service gateway 110 extracts host address 108 from data packet 349 and stores host address 108 into session entry 466.

Service gateway 110 modifies data packet 349 by replacing server address 360 with service address 336, and sends modified data packet 349 to host 100 corresponding to host address 108.

In one embodiment, service gateway 110 compares data packet 349 against session table 452 prior to comparing data packet 349 against service mapping table 412. Service gateway 110 obtains server address 360 of data packet 308 and compares server address 360 against session table 452. In one embodiment, service gateway 110 obtains further host address 108 of data packet 308 and matches server address 360 together with host address 108 against session table 452. In an embodiment, service gateway 110 finds a match with session entry 466. Service gateway 110 modifies data packet 308 by replacing server address 360 of data packet 304 by service address 336 of session entry 466, and sends modified data packet 349 to host 100 associated to host address 108.

In one embodiment, service gateway 110 does not find a match between data packet 308 and session table 452. Service gateway 110 proceeds to compare data packet 308 against service mapping table 412, as described above.

In one embodiment, service gateway 110 uses session entry 466 created using data packet 308 received from server 260, in comparing subsequent host-side session data packet against session table 452. In one embodiment, service gateway 110 uses session entry 454 created using data packet 304 received from host 100, in comparing subsequent server-side session data packets against session table 452.

Figure 4:
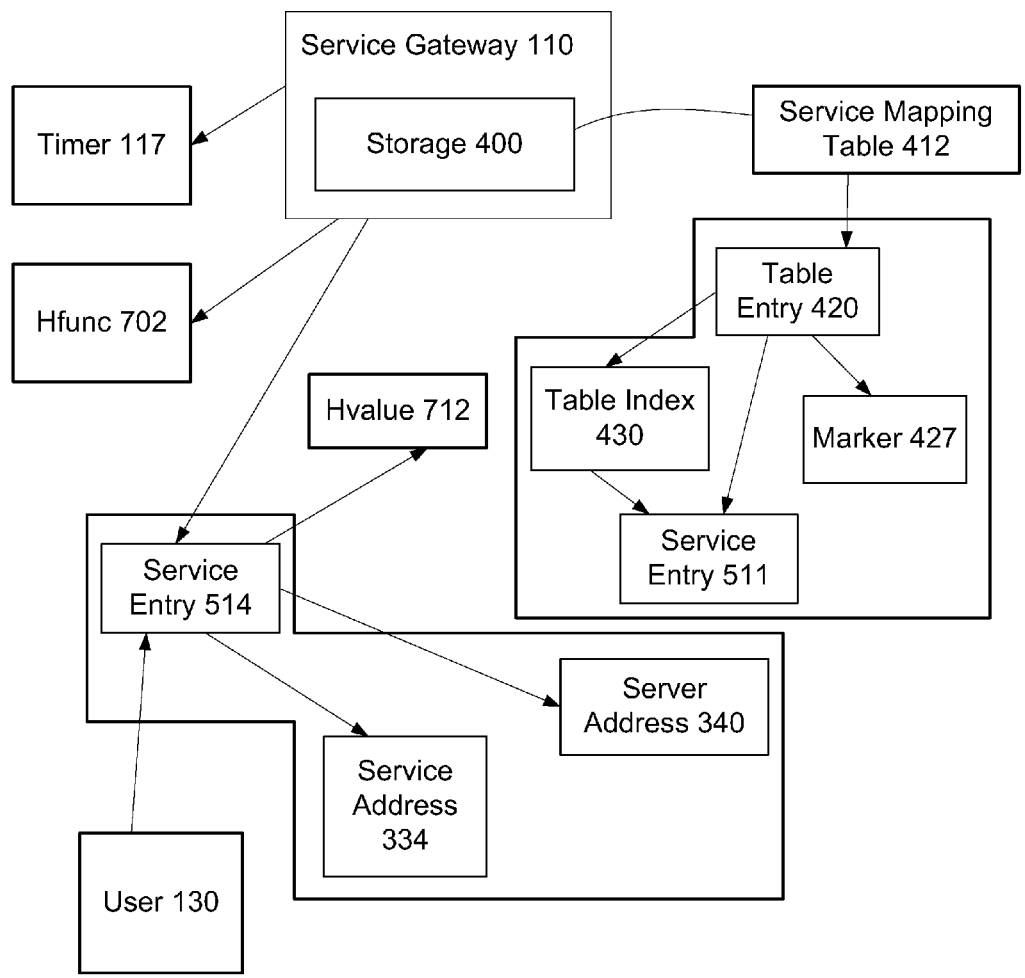
FIG. 4 illustrates an embodiment of a process to add a service entry according to the present invention.

FIG. 4 illustrates an embodiment of a process to activate a service entry according to the present invention. In one embodiment, service mapping table 412 includes service table entry 420 indexed by table index 430. Service table entry 420 is associated with service entry 511.

Service gateway 110 includes a hash function HFunc 702. In one embodiment, HFunc 702 is the same as HFunc 701. In one embodiment, HFunc 702 is different from HFunc 701.

In one embodiment, service gateway 110 activates service entry 514, which includes service address 334 and server address 340. In one embodiment, service gateway 110 receives service entry 514 from a user 130. In one embodiment, user 130 is a network administrator, or a network management system. In one embodiment, service gateway receives service entry 514 from a pre-determined configuration retrieved from storage or received remotely from a network.

Service gateway 110 applies hash function HFunc 702 to service entry 514 to obtain a hash value HValue 712. In one embodiment, HFunc 702 is applied to service address 334. In one embodiment, HFunc 702 is applied to server address 340. In one embodiment, HFunc 702 is applied to both service address 334 and server address 340. Service gateway 110 calculates a hash value HValue 712. In one embodiment, hash value HValue 712 matches table index 430 of service mapping table 412. Service gateway 110 retrieves service table entry 420 using table index 430. Service gateway 110 adds an association with service entry 514 to service table entry 420 so that service table entry 420 is associated with both service entry 511 and service entry 514. In one embodiment, service gateway 110 stores a change marker 427 to service table entry 420 or sets the change marker 427 value to "TRUE".

In one embodiment, service gateway 110 set a timer 117 for the activation or service entry 514. When timer 117 expires. Service gateway 110 removes the association with service entry 511 from service table entry 420. Service gateway 110 removes change marker 427 from service table entry 420 or changes the value of marker 427 to "FALSE". Service table entry 420 maintains the association with service entry 514. By setting the time 117, existing connections related to service entry 511 may be migrated to the session table 452, as described above, prior to the removal of service entry 511 from service table entry 420, reducing disruptions to existing session connections.

Figure 5:
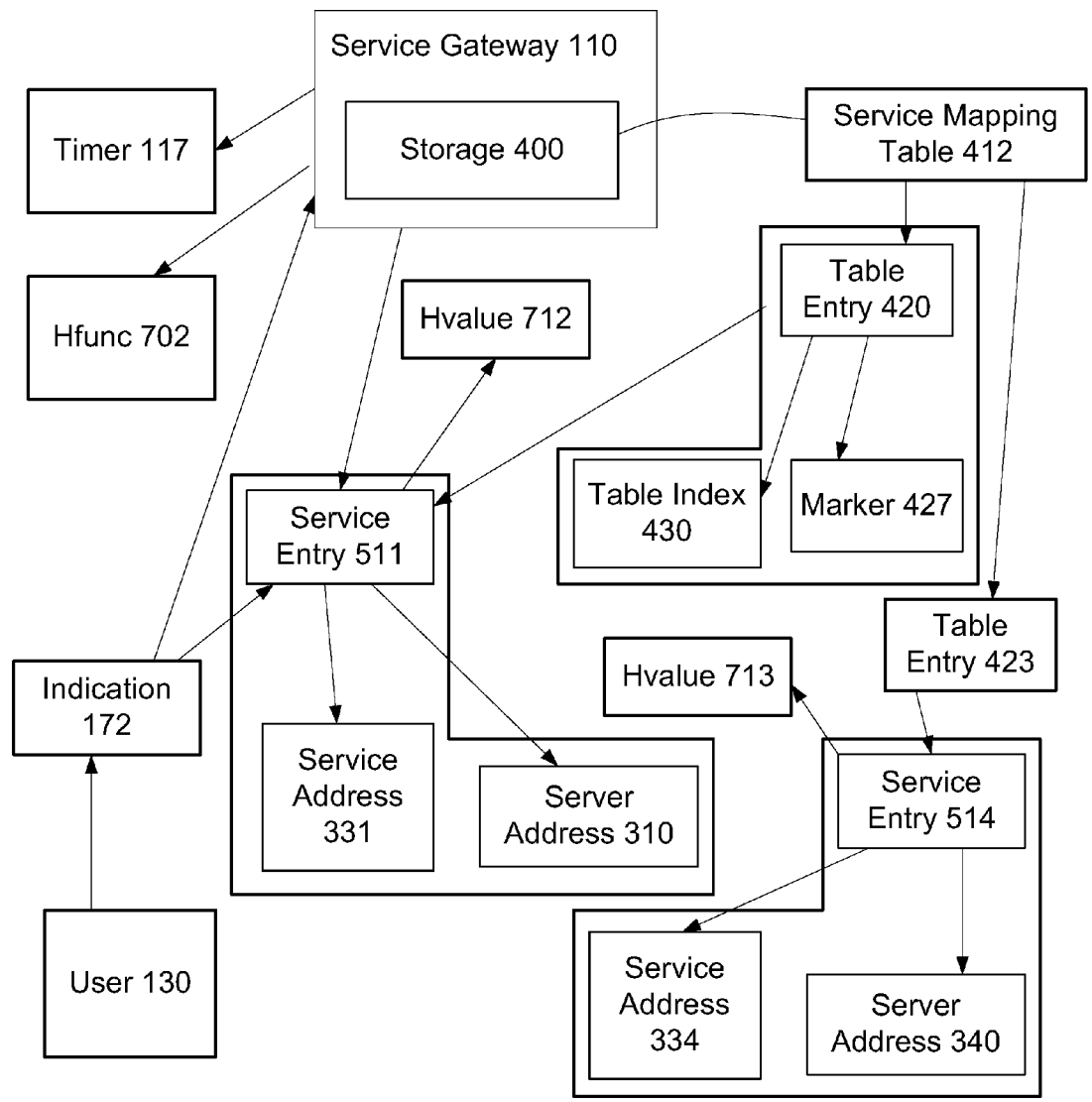
FIG. 5 illustrates an embodiment of a process to remove a service entry according to the present invention.

FIG. 5 illustrates a process to deactivate a service entry 511. Service mapping table 412 includes a service table entry 420 associated with service entry 511. Service mapping table 412 further includes a second service table entry 423 associated with service entry 514 different from service entry 511, such as a deactivate command or request. Service gateway 110 receives a deactivate indication 172 to deactivate service entry 511. In one embodiment, service gateway 110 receives the indication 172 from user 130. In one embodiment, service gateway 110 receives the indication 172 from a pre-determined configuration retrieved from storage or remotely over a data network.

Indication 172 includes service entry 511. Service entry 511 includes service address 331 and server address 310. Service gateway 110 obtains service entry 511 from indication 172.

In one embodiment, service gateway 110 calculates a hash value HValue 712 by applying HFunc 702 to service entry 511. In one embodiment, service gateway 110 applies HFunc 702 to service address 331 of service entry 511. In one embodiment, service gateway 110 applies HFunc 702 to server address 310 of service entry 511. In one embodiment, service gateway applies HFunc 702 to both service address 331 and server address 310. Service gateway 110 compares HValue 712 against service mapping table 412 and finds a match with table index 430. Service gateway 110 retrieves service table entry 420 using table index 430 from service mapping table 412.

In one embodiment, service gateway 110 compares service entry 511 against service mapping table 412. In one embodiment, service gateway 110 compares service address 331 of service entry 511 to service address 331 of service table entry 420 and finds a match. In one embodiment, service gateway 110 compares server address 310 of service entry 511 to server address 310 of service table entry 420 and finds a match. In one embodiment, service gateway 110 compares both service address 331 and server address 310 of service entry 511 and finds a match with service table entry 420. Service gateway 110 determines table index 430 of the matching service table entry 420.

Service gateway 110 proceeds to select a replacement service entry 514 for service table entry 423. In one embodiment, in selecting service entry 514 from service mapping table 412, service gateway 110 selects a service table entry 423 and applies hash function HFunc 702 to service entry 514 of service table entry 423. Service gateway 110 calculates a hash value HValue 713 by applying HFunc 702 to service entry 514. Service gateway 110 compares HValue 713 to table index 430 and finds a match. Service gateway 110 adds an association with service entry 514 to service table entry 420 so that service table entry 420 is associated with both service entry 511 and service entry 514. In one embodiment, service gateway 110 stores a change marker 427 to service table entry 420 or sets the change marker 427 value to "TRUE". In one embodiment, service gateway 110 selects service entry 514 by applying the hash function HFunc 702 to one or more service entries in service mapping table 412.

In one embodiment, service gateway 110 set a timer 117 for the activation of service entry 514. When timer 117 expires. Service gateway 110 removes the association with service entry 511 from service table entry 420. Service gateway 110 remove change marker 427 from service table entry 420 or changes the value of marker 427 to "FALSE". Service table entry 420 maintains an association with service entry 514.

In one embodiment, service table entry 420 includes a pre-determined alternate association service entry 514. In one embodiment, service gateway 110 selects service entry 514 by retrieving the alternate association service entry 514 of service table entry 420 from storage or remotely over a data network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing services by a service gateway, comprising:

obtaining a first service entry and a second service entry by the service gateway, the first service entry comprising a first service address and a first server address, the second service entry comprising a second service address and a second server address;

obtaining a service table entry of a service mapping table, the service table entry having an association with the second service entry;

adding to the service table entry an association to the first service entry; storing a marker value associated with the service table entry to indicate that the service table entry is associated with a plurality of service entries;

setting a timer associated with the service table entry to a predetermined duration;

in response to an expiration of the timer, removing the association with the second service entry from the service table entry;

prior to the removing of the association with the second service entry from the service table entry:

receiving a data packet by the service gateway from a host, the data packet comprising a third service address;

comparing the third service address of the data packet with the first service address of the first service entry or with the second service address of the second service entry;

in response to finding a match between the third service address and the first service address, or between the third service address and the second service address, determining the marker value associated with the service table entry;

in response to determining that the marker value indicates that the service table entry is associated with a plurality of service entries, creating a session entry based on the service table entry and storing the session entry in a session table;

in response to finding the match between the third service address and the first service address, modifying the data packet by replacing the third service address with the first server address;

in response to finding the match between the third service address and the second service address, modifying the data packet by replacing the third service address with the second server address; and sending the modified data packet to the first server address or the second server address; and in response to removing the association with the second service from the service table entry, changing the marker value to indicate that the service table entry is not associated with a plurality of service entries.

2. The method of claim 1, wherein the creating comprises: in response to finding the match between the third service address and the first service address, and in response to determining that the marker value indicates that the service table entry is associated with the plurality of service entries, storing the first server address of the first service entry and the third service address of the data packet in the session entry; and in response to finding the match between the third service address and the second service address, and in response to determining that the marker value indicates that the service table entry is associated with the plurality of service entries, storing the second server address of the second service entry and the third service address of the data packet in the session entry.

3. The method of claim 1, wherein the receiving a data packet by the service gateway from a host comprises: receiving the data packet from the host; comparing the data packet against session entries in the session table; in response to finding a match between the data packet and a given session entry in the session table: modifying the data packet by replacing the third service address with a given server address in the given session entry;

skipping the comparing the third service address of the data packet with the first service address of the first service entry or with the second service address of the second service entry, the determining, the creating, the modifying the data packet by replacing the third service address with the first server address, the modifying the data packet by replacing the third service address with the second server address, and the sending; and sending the modified data packet to the given server address; and in response to finding no matches between the data packet and the session entries, performing the comparing the third service address of the data packet with the first service address of the first service entry or with the second service address of the second service entry, the determining, the creating, the modifying the data packet by replacing the third service address with the first server address, the modifying the data packet by replacing the third service address with the second server address, and the sending the modified data packet to the first server address or the second server address.

4. A method for managing services by a service gateway, comprising:

obtaining a first service entry and a second service entry by the service gateway, the first service entry comprising a first service address and a first server address, the second service entry comprising a second service address and a second server address;

obtaining a service table entry of a service mapping table, the service table entry having an association with the second service entry;

adding to the service table entry an association to the first service entry;

storing a marker value associated with the service table entry to indicate that the service table entry is associated with a plurality of service entries;

setting a timer associated with the service table entry to a predetermined duration;

in response to an expiration of the timer, removing the association with the second service entry from the service table entry; and prior to the removing of the association with the second service entry from the service table entry:

receiving a data packet by the service gateway from a server, the data packet comprising a third server address;

comparing the third server address of the data packet with the first server address of the first service entry or with the second server address of the second service entry;

in response to finding a match between the third server address and the first server address, or between the third server address and the second server address, determining the marker value associated with the service table entry;

in response to determining that the marker value indicates that the service table entry is associated with a plurality of service entries, creating a session entry based on the service table entry and storing the session entry in a session table;

in response to finding the match between the third server address and the first server address, modifying the data packet by replacing the third server address with the first service address;

in response to finding the match between the third server address and the second server address, modifying the data packet by replacing the third server address with the second service address;

and sending the modified data packet to a host address from the data packet.

5. The method of claim 4, wherein the creating comprises: in response to finding the match between the third server address and the first server address, and in response to determining that the marker value indicates that the service table entry is associated with the plurality of service entries, storing the first service address of the first service entry and the third server address of the data packet in the session entry; and in response to finding the match between the third server address and the second server address, and in response to determining that the marker value indicates that the service table entry is associated with the plurality of service entries, storing the second service address of the second service entry and the third service address of the data packet in the session entry.

6. The method of claim 4, wherein the receiving a data packet by the service gateway from a server comprises:
receiving the data packet from the server;
comparing the data packet against session entries in the session table; in response to finding a match between the data packet and a given session entry in the session table:
modifying the data packet by replacing the third server address with a given service address in the given session entry;
skipping the comparing the third server address of the data packet with the first server address of the first service entry or with the second server address of the second service entry, the determining, the creating, the modifying the data packet by replacing the third server address with the first service address, the modifying the data packet by replacing the third server address with the second service address, and the sending; and
sending the modified data packet to the host address; and
in response to finding no matches between the data packet and the session entries, performing the comparing the third server address of the data packet with the first server address of the first service entry or with the second server address of the second service entry, the determining, the creating, the modifying the data packet by replacing the third server address with the first service address, the modifying the data packet by replacing the third server address with the second service address, and the sending the modified data packet to a host address from the data packet.

7. The method of claim 1, wherein the obtaining comprises:
receiving the first service entry for a service to be activated by the service gateway; and
retrieving the service table entry of the service mapping table using the first service address or the first server address of the first service entry.

8. The method of claim 1, wherein the obtaining comprises:
receiving the second service entry for a service to be deactivated by the service gateway; and
retrieving the first service entry using the second service entry by the service gateway.

9. The method of claim 8, wherein the receiving the second service entry for the service to be deactivated by the service gateway, the retrieving, and the adding comprises: receiving an indication to deactivate the second service entry by the service gateway; calculating a first hash value for the second service address or the second server address of the second service entry; determining whether a second hash value of the first service entry in the service mapping table matches the first hash value; and in response to determining that the second hash value matches the first hash value, adding an association with the first service entry to the service table entry.

10. A computer program product for managing services, the computer program product comprising:
a non-transitory computer readable medium having computer readable program code embodied therewith, the computer readable program code configured to:
obtain a first service entry and a second service entry, the first service entry comprising a first service address and a first server address, the second service entry comprising a second service address and a second server address;
obtain a service table entry of a service mapping table, the service table entry having an association with the second service entry;
add to the service table entry an association to the first service entry;
store a marker value associated with the service table entry to indicate that the service table entry is associated with a plurality of service entries;
set a timer associated with the service table entry to a predetermined duration; and
in response to an expiration of the timer, remove the association with the second service entry from the service table entry;
prior to the removing of the association with the second service entry from the service table entry:
receive a data packet by the service gateway from a host, the data packet comprising a third service address;
compare the third service address of the data packet with the first service address of the first service entry or with the second service address of the second service entry;
in response to finding a match between the third service address and the first service address, or between the third service address and the second service address, determine the marker value associated with the service table entry;
in response to determining that the marker value indicates that the service table entry is associated with a plurality of service entries, create a session entry based on the service table entry and storing the session entry in a session table;
in response to finding the match between the third service address and the first service address, modify the data packet by replacing the third service address with the first server address;
in response to finding the match between the third service address and the second service address, modify the data packet by replacing the third service address with the second server address; and
send the modified data packet to the first server address or the second server address; and
in response to removing the association with the second service from the service table entry, change the marker value to indicate that the service table entry is not associated with a plurality of service entries.

11. The computer program product of claim 10, wherein the create comprises: in response to finding the match between the third service address and the first service address, and in response to determining that the marker value indicates that the service table entry is associated with the plurality of service entries, store the first server address of the first service entry and the third service address of the data packet in the session entry; and in response to finding the match between the third service address and the second service address, and in response to determining that the marker value indicates that the service table entry is associated with the plurality of service entries, store the second server address of the second service entry and the third service address of the data packet in the session entry.

12. The computer program product of claim 10, wherein the receive a data packet by the service gateway from a host comprises:

receive the data packet from the host;
compare the data packet against session entries in the session table;
in response to finding a match between the data packet and a given session entry in the session table:
  modify the data packet by replacing the third service address with a given server address in the given session entry;
  skip the compare the third service address of the data packet with the first service address of the first service entry or with the second service address of the second service entry, the determine, the create, the modify the data packet by replacing the third service address with the first server address, the modify the data packet by replacing the third service address with the second server address, and the send; and
  send the modified data packet to the given server address; and
in response to finding no matches between the data packet and the session entries, perform the compare the third service address of the data packet with the first service address of the first service entry or with the second service address of the second service entry, the determine, the create, the modify the data packet by replacing the third service address with the first server address, the modify the data packet by replacing the third service address with the second server address, and the send the modified data packet to the first server address or the second server address.

13. A computer program product for managing services, the computer program product comprising:
  a computer readable medium having computer readable program code embodied therewith, the computer readable program code configured to:
    obtain a first service entry and a second service entry, the first service entry comprising a first service address and a first server address, the second service entry comprising a second service address and a second server address;
    obtain a service table entry of a service mapping table, the service table entry having an association with the second service entry;
    add to the service table entry an association to the first service entry;
    store a marker value associated with the service table entry to indicate that the service table entry is associated with a plurality of service entries;
    set a timer associated with the service table entry to a predetermined duration;
    in response to an expiration of the timer, remove the association with the second service entry from the service table entry; and
    prior to the removing of the association with the second service entry from the service table entry:
      receive a data packet by the service gateway from a server, the data packet comprising a third server address;
      compare the third server address of the data packet with the first server address of the first service entry or with the second server address of the second service entry;
      in response to finding a match between the third server address and the first server address, or between the third server address and the second server address, determine the marker value associated with the service table entry;
      in response to determining that the marker value indicates that the service table entry is associated with a plurality of service entries, create a session entry based on the service table entry and storing the session entry in a session table;
      in response to finding the match between the third server address and the first server address, modify the data packet by replacing the third server address with the first service address;
      in response to finding the match between the third server address and the second server address, modify the data packet by replacing the third server address with the second service address; and
      send the modified data packet to a host address from the data packet.

14. The computer program product of claim 13, wherein the create comprises:
  in response to finding the match between the third server address and the first server address, and in response to determining that the marker value indicates that the service table entry is associated with the plurality of service entries, store the first service address of the first service entry and the third server address of the data packet in the session entry; and
  in response to finding the match between the third server address and the second server address, and in response to determining that the marker value indicates that the service table entry is associated with the plurality of service entries, store the second service address of the second service entry and the third service address of the data packet in the session entry.

15. The computer program product of claim 13, wherein the receive a data packet by the service gateway from a server comprises:
  receive the data packet from the server;
  compare the data packet against session entries in the session table;
  in response to finding a match between the data packet and a given session entry in the session table:
    modify the data packet by replacing the third server address with a given service address in the given session entry;
    skip the compare the third server address of the data packet with the server address of the first service entry or with the second server address of the second service entry, the determine, the create, the modify the data packet by replacing the third server address with the first service address, the modify the data packet by replacing the third server address with the second service address, and the send; and
    send the modified data packet to the host address; and
  in response to finding no matches between the data packet and the session entries, perform the compare the third server address of the data packet with the server address of the first service entry or with the second server address of the second service entry, the determine, the create, the modify the data packet by replacing the third server address with the first service address, the modify the data packet by replacing the third server address with the second service address, and the send the modified data packet to a host address from the data packet.

16. The computer program product of claim 10, wherein the obtain comprises:
  receive the first service entry for a service to be activated by the service gateway; and
  retrieve the service table entry of the service mapping table using the first service address or the first server address of the first service entry.

17. The computer program product of claim 10, wherein the obtain comprises:
  receive the second service entry for a service to be deactivated by the service gateway; and
  retrieve the first service entry using the second service entry by the service gateway.

18. The computer program product of claim 17, wherein the receive the second service entry for the service to be deactivated by the service gateway, the retrieve, and the add comprises:
  receive an indication to deactivate the second service entry by the service gateway; calculate a first hash value for the second service address or the second server address of the second service entry;
  determine whether a second hash value of the first service entry in the service mapping table matches the first hash value; and
  in response to determining that the second hash value matches the first hash value, add an association with the first service entry to the service table entry.

19. A system, comprising: a processor; and a non-transitory computer readable medium having computer readable program code embodied therewith for execution by the processor, the computer readable program code configured to:
  obtain a first service entry and a second service entry, the first service entry comprising a first service address and a first server address, the second service entry comprising a second service address and a second server address;
  obtain a service table entry of a service mapping table, the service table entry having an association with the second service entry;
  add to the service table entry an association to the first service entry;
  store a marker value associated with the service table entry to indicate that the service table entry is associated with a plurality of service entries;
  set a timer associated with the service table entry to a predetermined duration;
  in response to an expiration of the timer, remove the association with the second service entry from the service table entry;
  prior to the removing of the association with the second service entry from the service table entry:
  receive a data packet by the service gateway from a host, the data packet comprising a third service address;
  compare the third service address of the data packet with the first service address of the first service entry or with the second service address of the second service entry;
  in response to finding a match between the third service address and the first service address, or between the third service address and the second service address, determine the marker value associated with the service table entry;
  in response to determining that the marker value indicates that the service table entry is associated with a plurality of service entries, create a session entry based on the service table entry and storing the session entry in a session table;
  in response to finding the match between the third service address and the first service address, modify the data packet by replacing the third service address with the first server address;
  in response to finding the match between the third service address and the second service address, modify the data packet by replacing the third service address with the second server address; and
  send the modified data packet to the first server address or the second server address; and
  in response to removing the association with the second service from the service table entry, change the marker value to indicate that the service table entry is not associated with a plurality of service entries.

20. The system of claim 19, wherein the create comprises:
  in response to finding the match between the third service address and the first service address, and in response to determining that the marker value indicates that the service table entry is associated with the plurality of service entries, store the first server address of the first service entry and the third service address of the data packet in the session entry; and
  in response to finding the match between the third service address and the second service address, and in response to determining that the marker value indicates that the service table entry is associated with the plurality of service entries, store the second server address of the second service entry and the third service address of the data packet in the session entry.

21. The system of claim 19, wherein the receive a data packet by the service gateway from a host comprises:
  receive the data packet from the host;
  compare the data packet against session entries in the session table;
  in response to finding a match between the data packet and a given session entry in the session table:
    modify the data packet by replacing the third service address with a given server address in the given session entry;
    skip the compare the third service address of the data packet with the first service address of the first service entry or with the second service address of the second service entry, the determine, the create, the modify the data packet by replacing the third service address with the first server address, the modify the data packet by replacing the third service address with the second server address, and the send; and
    send the modified data packet to the given server address; and
  in response to finding no matches between the data packet and the session entries, perform the compare the third service address of the data packet with the first service address of the first service entry or with the second service address of the second service entry, the determine, the create, the modify the data packet by replacing the third service address with the first server address, the modify the data packet by replacing the third service address with the second server address, and the send the modified data packet to the first server address or the second server address.

22. A system, comprising:
  a processor; and
  a non-transitory computer readable medium having computer readable program code embodied therewith for execution by the processor, the computer readable program code configured to:
  obtain a first service entry and a second service entry, the first service entry comprising a first service address and a first server address, the second service entry comprising a second service address and a second server address;
  obtain a service table entry of a service mapping table, the service table entry having an association with the second service entry;

add to the service table entry an association to the first service entry;
store a marker value associated with the service table entry to indicate that the service table entry is associated with a plurality of service entries;
set a timer associated with the service table entry to a predetermined duration; in response to an expiration of the timer, remove the association with the second service entry from the service table entry;
prior to the removing of the association with the second service entry from the service table entry:
receive a data packet by the service gateway from a server, the data packet comprising a third server address;
compare the third server address of the data packet with the first server address of the first service entry or with the second server address of the second service entry;
in response to finding a match between the third server address and the first server address, or between the third server address and the second server address, determine the marker value associated with the service table entry;
in response to determining that the marker value indicates that the service table entry is associated with a plurality of service entries, create a session entry based on the service table entry and storing the session entry in a session table;
in response to finding the match between the third server address and the first server address, modify the data packet by replacing the third server address with the first service address;
in response to finding the match between the third server address and the second server address, modify the data packet by replacing the third server address with the second service address; and
send the modified data packet to a host address from the data packet; and in response to removing the association with the second service from the service table entry, change the marker value to indicate that the service table entry is not associated with a plurality of service entries.

23. The system of claim 22, wherein the create comprises:
in response to finding the match between the third server address and the first server address, and in response to determining that the marker value indicates that the service table entry is associated with the plurality of service entries, store the first service address of the first service entry and the third server address of the data packet in the session entry; and
in response to finding the match between the third server address and the second server address, and in response to determining that the marker value indicates that the service table entry is associated with the plurality of service entries, store the second service address of the second service entry and the third service address of the data packet in the session entry.

24. The system of claim 22, wherein the receive a data packet by the service gateway from a server comprises:
receive the data packet from the server;
compare the data packet against session entries in the session table;
in response to finding a match between the data packet and a given session entry in the session table:
modify the data packet by replacing the third server address with a given service address in the given session entry;
skip the compare the third server address of the data packet with the first server address of the first service entry or with the second server address of the second service entry, the determine, the create, the modify the data packet by replacing the third server address with the first service address, the modify the data packet by replacing the third server address with the second service address, and the send; and
send the modified data packet to the host address; and
in response to finding no matches between the data packet and the session entries, perform the compare the third server address of the data packet with the first server address of the first service entry or with the second server address of the second service entry, the determine, the create, the modify the data packet by replacing the third server address with the first service address, the modify the data packet by replacing the third server address with the second service address, and the send the modified data packet to a host address from the data packet.

25. The system of claim 19, wherein the obtain comprises:
receive the first service entry for a service to be activated by the service gateway; and
retrieve the service table entry of the service mapping table using the first service address or the first server address of the first service entry.

26. The system of claim 19, wherein the obtain comprises:
receive the second service entry for a service to be deactivated by the service gateway; and
retrieve the first service entry using the second service entry by the service gateway.

27. The system of claim 26, wherein the receive the second service entry for a service to be deactivated by the service gateway, the retrieve, and the add comprises:
receive an indication to deactivate the second service entry by the service gateway;
calculate a first hash value for the second service address or the second server address of the second service entry;
determine whether a second hash value of the first service entry in the service mapping table matches the first hash value; and
in response to determining that the second hash value matches the first hash value, add an association with the first service entry to the service table entry.

* * * * *